United States Patent [19]

Wild et al.

[11] Patent Number: 4,886,597
[45] Date of Patent: Dec. 12, 1989

[54] CENTRIFUGAL REVERSE-OSMOSIS DESALINATION UNIT

[75] Inventors: Peter M. Wild; Geoffrey W. Vickers; David A. Hopkin; Antony Moilliet, all of Victoria, Canada

[73] Assignee: Her Majesty the Queen in right of Canada, Ontario, Canada

[21] Appl. No.: 243,273

[22] Filed: Sep. 12, 1988

[30] Foreign Application Priority Data

Sep. 24, 1987 [CA] Canada ................................. 547791

[51] Int. Cl.$^4$ ............................................ B01C 13/00
[52] U.S. Cl. .......................... 210/321.68; 210/321.84
[58] Field of Search ............ 210/321.6, 321.68, 321.84

[56] References Cited

U.S. PATENT DOCUMENTS 3,385,769 5/1968 Brose .......................... 210/321.84 X
4,230,564 10/1980 Keefer .......................... 210/321.6 X Primary Examiner—Frank Spear
Attorney, Agent, or Firm—Nixon & Vanderhye

[57] ABSTRACT

The invention disclosed is a desalination apparatus for removing salt from seawater. The apparatus operates on the principle of reverse-osmosis whereby a feed solution containing seawater is separated into a product solution of decreased salt concentration and an exhaust solution of increased concentration. An evacuated enclosure is included to reduce windage losses and power consumption.

13 Claims, 4 Drawing Sheets

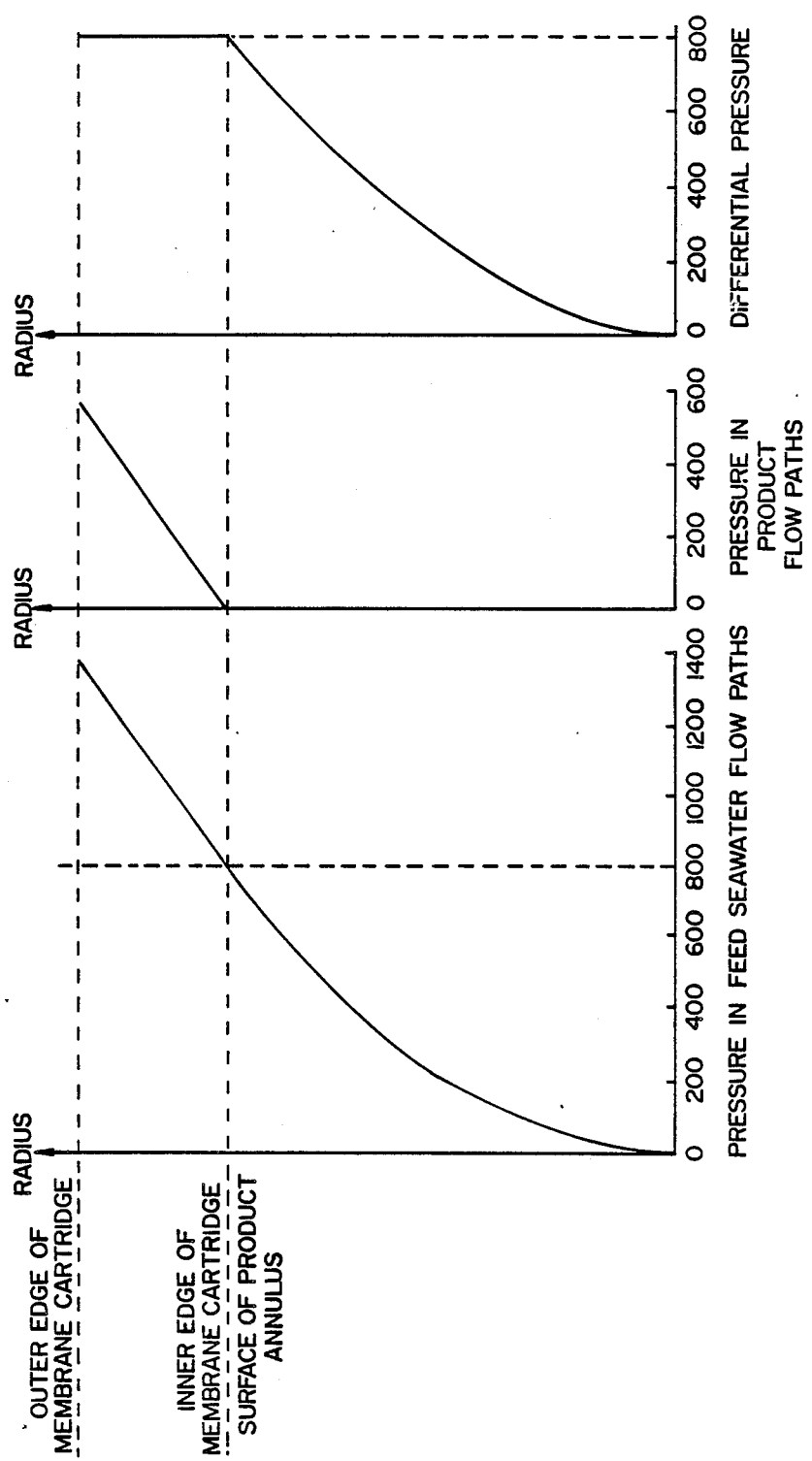

CENTRIFUGAL REVERSE-OSMOSIS DESALINATION UNIT

This invention relates to a desalination method and apparatus and in particular to an apparatus for removing salt from water by reverse-osmosis.

Reverse-osmosis is a high pressure process, e.g., 800 psi in the case of desalination of seawater. Traditionally, there have been two techniques for developing this high pressure, namely, high pressure pumps and centrifuges. Although a centrifuge offers theoretically higher efficiencies, commercial systems, almost without exception, have employed pumps. Practical difficulties have prevented widespread development of centrifugal reverse-osmosis desalination systems.

One of these difficulties is the design of a membrane configuration suitable for a centrifuge. For example, U.S. Pat. No. 3,669,879 of 13 June 1972 in the name of L. P. Berriman proposes various means for deploying a reverse-osmosis membrane within a single cylindrical rotating pressure vessel.

U.S. Pat. No. 4,333,832 by Siwecki et al employs, on the other hand, a number of smaller pressure vessels located about the periphery of a rotating structure or rotor. Each vessel contains a single cartridge of reverse-osmosis membrane material. This is a practical design but it is feasible only for relatively large rotor diameters. The reasons for this are twofold:

1. Pressure Gradient: The pressure within the pressure vessels is not uniform. There is a radial pressure gradient, with respect to the rotor axis. As commercially available membrane cartridges are effective only between 800 and 1000 psi, the pressure within a vessel should not exceed this range, i.e., the pressure should be 800 psi, at the edge closest to the rotor axis, and 1000 psi, at the edge furthest from the rotor axis. For any given cartridge diameter, there is a corresponding minimum rotor diameter which will satisfy these pressure conditions.

2. Windage: Windage is friction between the peripheral surface of the rotor and the surrounding air. At the speeds required to develop process pressure, the power lost to windage is significant.

Windage power per unit product diminishes with increasing unit capacity. The volume of membrane accommodated and, therefore, the productivity of a centrifugal ROD increases as the square of rotor diameter whereas the surface area and, therefore, windage increase only linearly with rotor diameter. The proportion of unit power attributable to windage, therefore, decreases with increasing unit size.

The Siwecki patent describes a stationary shroud enclosing the rotor. This restricts the circulation of air about the rotor, thereby reducing windage. As Siwecki states, however, only for large units can windage be "held to a small fraction of power costs" by this technique.

It is an object of the invention to separate a single solution, by means of a reverse-osmosis membrane, into two solutions; one of higher and one of lower concentration than the original solution. In this discussion the original solution is called the "feed", the reduced concentration solution is the "product" and the increased concentration solution is the "exhaust".

According to the invention, an apparatus for separating an original feed solution into a product solution of decreased concentration and an exhaust solution of increased concentration is provided, comprising
reverse-osmosis membrane means;
supply means for supplying the original feed solution to said reverse-osmosis membrane means;
exhaust means for removing the exhaust solution of increased concentration from said reverse-osmosis membrane means;
product removal means for removing the product solution of decreased concentration from said reverse-osmosis membrane means;
means for creating a pressure differential within said reverse-osmosis membrane means to separate the original feed solution into the product solution and the exhaust solution; and
evacuated enclosure means for said reverse-osmosis membrane means.

In the drawing which illustrates a preferred embodiment of the invention,

FIG. 4A, 4B and 4C are graphs depicting the radial pressure gradients in the apparatus according to the invention.

Figure 1:
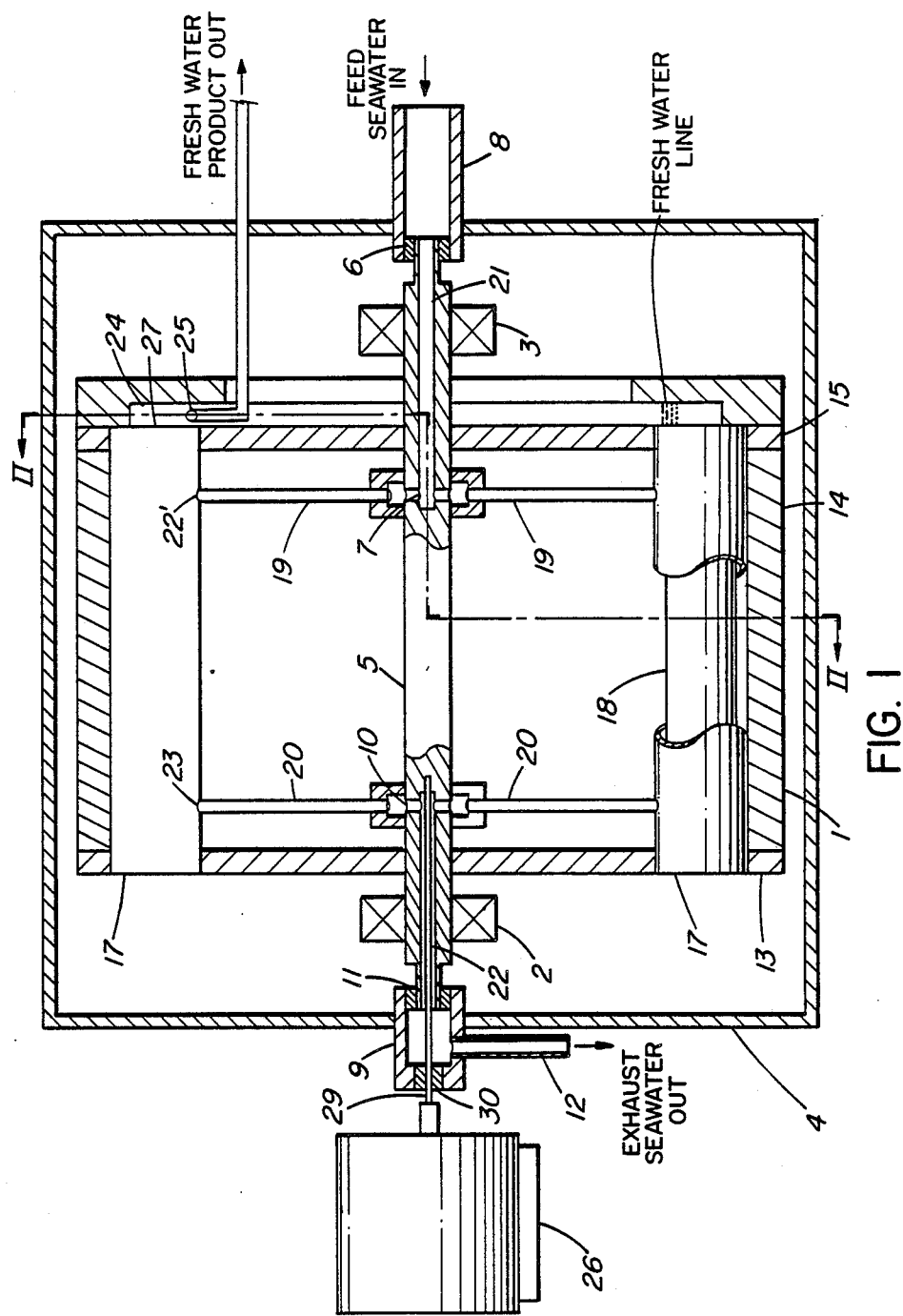
FIG. 1 is a side elevation partly in section of the apparatus according to the invention.

Referring to the drawing, a reverse-osmosis means is provided in a rotor assembly 1. The rotor assembly 1 is supported for rotation about axle 5 in bearings 2 and 3 within an evacuated enclosure means in the form of a close-fitting cylindrical stationary shroud 4. Vacuum means (not shown) is used to evacuate the shroud. The rotor assembly 1 consists of a circular array of tubular pressure vessels 17 radially spaced evenly about its periphery equidistant from axle 5. Each pressure vessel 17 contains a single cylindrical reverse-osmosis membrane cartridge 18 including a reverse-osmosis membrane. The pressure vessels 17 are supported radially about axle 5 by support means in the form of a cylindrical support shell 14. The pressure vessels 17 and shell 14 are located with respect to the axle 5 by circular end plates 13 and 15.

Means for creating a pressure differential within the reverse-osmosis membrane means is provided by the centrifugal force created by rotating the rotor assembly 1 at high speed.

The rotational drive is communicated to axle 5 from drive means 26, typically an electric motor, to the rotor assembly 1 through drive shaft 29. Evacuation of the shroud reduces windage, thereby permitting use of a much smaller motor than would otherwise be required, e.g. 5 H.P. as opposed to 50 H.P. without the evacuated shroud.

Figure 3:
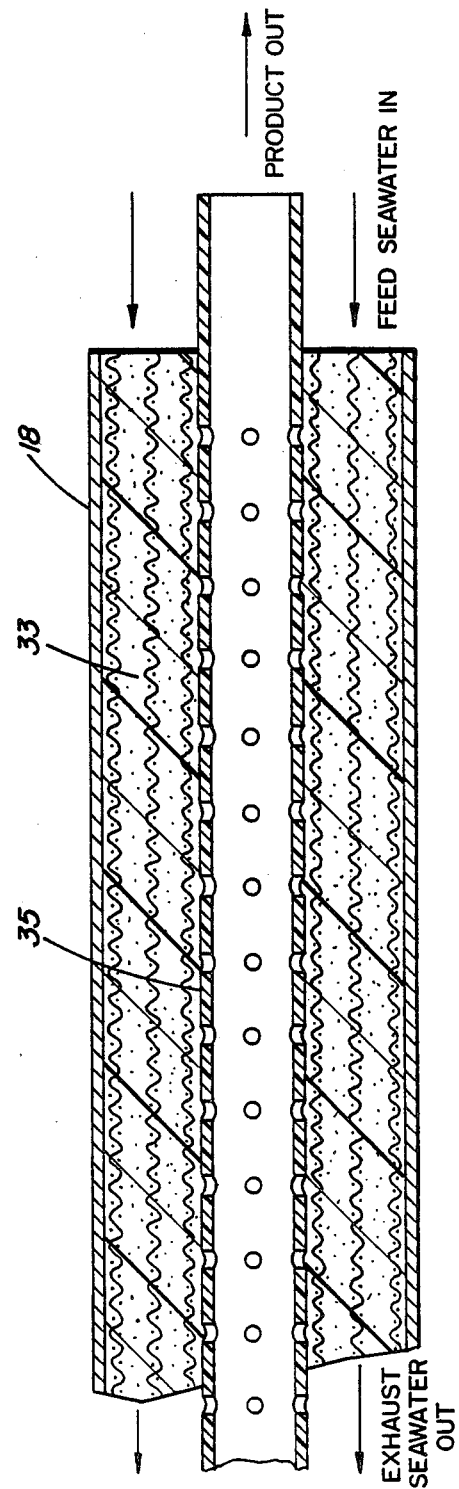
FIG. 3 is a side elevation in section of a state-of-the-art spirally wound reverse-osmosis membrane cartridge used in the apparatus, according to the invention.

Supply means is provided for supplying the original "feed" solution to the reverse-osmosis membrane means. Specifically, the "feed" is admitted to the rotor assembly 1 through stationary inlet conduit 8. It passes into bore 21 in the axle 5 via rotating coupling 6. Radial openings 7 in the axle 5 conduct the "feed" from the bore 21 into radial inlet conduits 19 and, thence, into pressure vessels 17 via "feed" inlet 22'. The "feed" is then directed axially into the membrane cartridge 18 as indicated in FIG. 3.

Exhaust means is provided for removing the "exhaust" solution from the reverse-osmosis membrane means. Specifically, the "exhaust" (not having passed through the reverse-osmosis membrane) returns to the axle bore 22 via exhaust outlet 23, radial outlet tubes 20 and through radial outlet openings in axle bore 22. The "exhaust" exits the rotor assembly through rotating coupling 11 and is directed from the system by stationary exhaust outlet assembly 9 and exhaust outlet conduit 12. Rotary seal 30 seals between drive shaft 29 and stationary outlet assembly 9.

Product removal means is provided for removing the "product" solution from the reverse-osmosis membrane means. Specifically, the "product" (having passed through the reverse-osmosis membrane) is directed axially from the membrane cartridges 18 as indicated in FIG. 3 through product outlet opening 27 into an annular inwardly facing groove 24 about the periphery of one end of the rotor assembly. The open "product" receiving end of conduit 25 resides in groove 24 and faces into the direction of rotation of rotor assembly. The other (exit) end of the conduit 25 is bent, so as to pass out of the groove 24 and out of the shroud 4. Product removal conduit 25 is provided within groove 24 to remove the "product" from the system. Specifically, the "product" is collected and retained within the groove by centripetal force. The inner surface of the spinning annulus of "product", thus formed, impinges on the open end of the outlet conduit 25 developing pressure therein. When this pressure exceeds ambient pressure, the "product" flows out through the conduit, thus acting as a "pump".

Commercially available reverse-osmosis membrane cartridges are produced in two styles, a first employing a spiral wound membrane and a second employing a hollow fibre membrane. Both styles of cartridges contain a configuration of adjacent "product" and "feed" flow-paths separated by a reverse-osmosis membrane. It is the pressure differential between these paths that drives the separation process.

In a typical spiral-wound cartridge, as manufactured by UOP Fluid Systems or Filmtec, the membrane is bonded to a sheet of porous support fabric. Two of these sheets, back to back and separated by a mesh spacer, are formed into an envelope and sealed on all but one edge. The mesh spacer is the "product" flow-path. The unsealed edge of the envelope is bonded to a central perforated plastic tube such that the carrier is open to the perforations. A sheet of coarser mesh is placed over the envelope and both are wound tightly around the perforated tube. This coarser mesh is the "feed" flow path.

Figure 2:
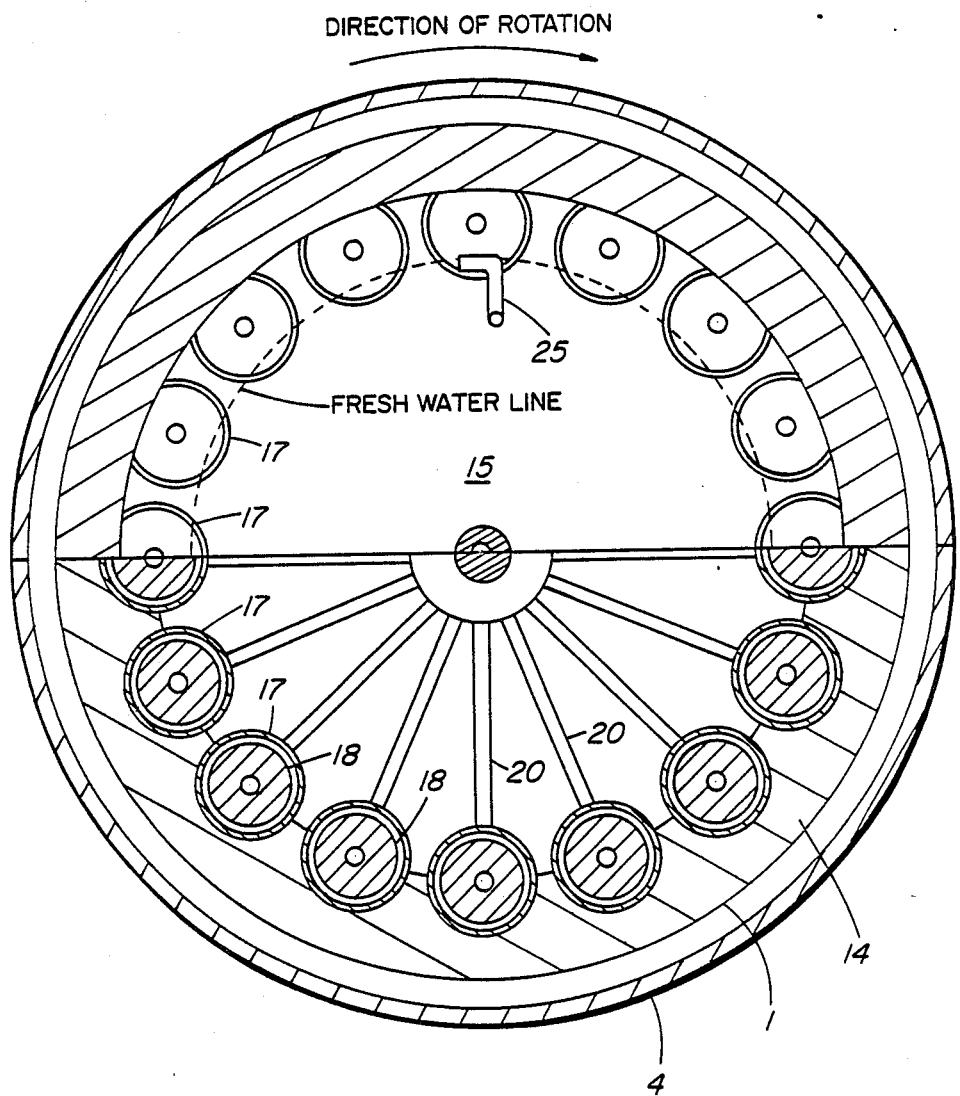
FIG. 2 is an end-view of the apparatus according to the invention, partly in section taken along line II—II in FIG. 1.

FIG. 3 is a side elevation of such a spiral wound cartridge showing the spiral configuration of membranes and meshes 33 and the perforated central tube 35 in section. The "feed" solution is admitted axially into cartridge 18 from inlet 22 (FIG. 2) and flows axially through the coarse mesh or "feed" flow path. As the "feed" passes through this mesh, the "product" fraction permeates through the membrane material and into the mesh spacer or "product" flow path. The mesh spacer directs the "product" spirally inwardly and into the perforated central tube 35 and, thence, from the cartridge. One end of this central tube is plugged, i.e. the end opposite to the "product" outlet. The remaining "exhaust" is expelled from the cartridge at the other end.

The "feed" flow-paths in the cartridges are continous with the "feed" flow paths in the rotor, i.e. bores 21, 22 and radial conduits 19, 20. The pressure in these "feed" flow-paths, therefore, increases continuously with displacement from the rotor axis as shown in FIG. 4A.

The "product" flow-paths in the cartridge are continuous with the "product" water held in the annular groove 24. The pressure in the "product" water flow-paths, therefore, depends upon the radius of the surface of the "product" water annulus. Pressure is zero at this surface. Pressure is positive at any location in the "product" flow-paths which is at a radius greater than this surface radius. As shown in FIG. 4B, this pressure increases with displacement from the rotor axis.

The applicant has found that the rate of increase of pressure in the "feed" water flow-paths is equal to the rate of increase of pressure in the "product" water flow-paths at any radius beyond the surface of the "product" water annulus.

As shown in FIG. 4C, the pressure differential across the membrane, from "feed" to "product" water flow paths is, therefore, constant from the surface of the "product" water annulus outward.

The radial pressure gradient within the "feed" flow-paths is described by the equation:

$$P_F = (p/2)w^2 R^2$$

"$P_F$" is pressure within the "feed" flow-paths, "p" is fluid density, "w" is the angular velocity of the rotor assembly and "R" is displacement from the rotor assembly axis. The pressure within the "product" flow-paths ($P_P$) increases according to the same relation:

$$P_P = (p/2)w^2(R^2 - R_A^2)$$

"$R_A$" is the radius of the surface of the "product" annulus. The differential pressure ($P_D$), therefore, is:

$$P_D = P_F - P_P$$

$$P_D = (p/2)w^2 R_A^2$$

The differential pressure is uniform and equal to the pressure in the "feed" flow-paths, at radius $R_A$.

If the surface of the "product" water annulus is coincident with the innermost edge of the membrane cartridges, then the pressure differential across the membrane is uniform throughout the cartridge and equal to the pressure in the "feed" flow-path at that innermost edge.

In the case of desalination of seawater, the pressure differential across the membrane is generally restricted to between 800 and 1000 psi. Below 800 psi, the "product" salinity is unacceptably high and above 1000 psi, the membrane is prone to rupture.

In this embodiment of the invention, the "product" receiving opening in conduit 25 is located so as to maintain the surface of the "product" annulus coincident with the innermost edge of the membrane cartridges. The rotor speed is controlled so as to ensure that the uniform pressure differential which results is between the required 800 and 1000 psi. For example:

If R = 12 in

| If R = 12 in | |
| --- | --- |
| Rotor speed | P Diff |
| (RPM) | (psi) |
| 3293 | 800 |
| 3493 | 900 |
| 3682 | 1000 |

The embodiments of the invention in which an exclusive property or privilege is claimed are defined as follows:

1. An apparatus for separating an original feed solution into a product solution of decreased concentration and an exhaust solution of increased concentration, comprising:
   reverse-osmosis membrane means;
   a single rotor assembly housing said reverse osmosis means, said rotor assembly comprising an array of pressure vessels each containing a reverse-osmosis membrane and support means for said array including axle means about which the assembly is rotatable, wherein said pressure vessels are radially spaced from said axle means about the periphery of said assembly;
   supply means for supplying the original feed solution to said reverse-osmosis membrane means;
   exhaust means for removing the exhaust solution of increased concentration from reverse-osmosis membrane means;
   product removal means for removing the product solution of decreased concentration from said reverse-osmosis membrane means;
   means for creating a pressure differential within said reverse-osmosis membrane to separate the original feed solution into the product solution and the exhaust solution; and
   evacuated enclosure means for said reverse-osmosis membrane means, said evacuated enclosure means being in the form of a shroud which closely fits over said rotor assembly to minimize windage losses.

2. Apparatus according to claim 1, wherein said means for creating a pressure differential is provided by drive means for imparting rotational drive to said rotor assembly.

3. Apparatus according to claim 1, wherein said pressure vessels are in a circular array spaced evenly about said assembly equidistant from said axel means.

4. Apparatus according to claim 3, wherein said supply means includes means for admitting the original feed solution at said axel means and to conduct it radially to said pressure vessels.

5. Apparatus according to claim 4, wherein said exhaust means includes means for returning the exhaust solution to said axel means where it is removed from the apparatus.

6. Apparatus according to claim 5, wherein said product removal means includes means for collecting the product solution.

7. Apparatus according to claim 6, wherein said product collecting means is in the form of an annular inwardly-facing groove about the periphery of one end of the rotor assembly for collecting said product solution in the vicinity of said pressure vessels.

8. Apparatus according to claim 7, wherein said product removal means further includes product receiving conduit means located in said annular groove, said conduit means having an open end facing into the direction of rotation of the rotor assembly, the other end being located outside of said evacuated enclosure means, whereby the product solution flows out of the assembly through the conduit due to the pressure differential induced by the impingement of the product solution on the open end of said conduit.

9. Apparatus according to claim 8, wherein said pressure vessels comprise a tubular casing and an inner concentric cylindrical reverse-osmosis membrane cartridge structure defining adjacent product solution and feed solution flow paths separated by a reverse-osmosis membrane, whereby said feed solution enters said feed solution flow path at one end of said pressure vessel and flows axially along said feed flow paths and is separated into said exhaust solution which exits at the other end of said casing, and said product solution which permeates through said reverse-osmosis membrane into said product solution flow path and is directed into said annular groove where it forms a spinning annulus of product solution therein which is removed from the pressure vessels at said one end.

10. Apparatus according to claim 9 wherein the pressure differential across said reverse-osmosis membrane is substantially uniform throughout.

11. Apparatus according to claim 10, wherein the pressure differential is between 800 and 1000 psi.

12. Apparatus according to claim 10, wherein the product receiving open end of said conduit means is located to maintain the inner surface of the annulus of product solution within said annular groove coincident with the surface of the reverse-osmosis cartridge nearest to the rotor assembly axel.

13. Apparatus according to claim 1, wherein said original feed solution is brine and wherein said product solution is potable water.

* * * * *